United States Patent [19]
De Pauw et al.

[11] 3,884,701
[45] May 20, 1975

[54] METHOD OF PREPARING SILVER HALIDE EMULSIONS

[75] Inventors: Alfons Jozef De Pauw, Edegem; Jan Albert Carpentier, Walem, both of Belgium

[73] Assignee: Agfa-Gevaert, N.V., Mortsel, Belgium

[22] Filed: July 24, 1973

[21] Appl. No.: 382,115

[30] Foreign Application Priority Data
Aug. 3, 1972 United Kingdom............... 36370/72

[52] U.S. Cl.................. 96/114.8; 96/94 R; 96/114; 96/114.7
[51] Int. Cl. .......................... G03c 1/02; G03c 1/04
[58] Field of Search....... 96/114.8, 114, 94 R, 114.7

[56] References Cited
UNITED STATES PATENTS

| | | | |
|---|---|---|---|
| 2,614,928 | 10/1952 | Yutzy et al. ...................... | 96/114.8 |
| 2,956,880 | 10/1960 | Gates, Jr. et al.................... | 96/114.8 |
| 3,168,403 | 2/1965 | Himmelmann et al. .............. | 96/114 |
| 3,436,220 | 4/1969 | Dersch et al....................... | 96/114.8 |

*Primary Examiner*—Norman G. Torchin
*Assistant Examiner*—Alfonso T. Suro Pico
*Attorney, Agent, or Firm*—A. W. Breiner

[57] ABSTRACT

A method is disclosed of preparing washed silver halide emulsions wherein silver halide grain formation is effected in the presence of gelatin and an acid-coagulable gelatin-derivative, the said derivative being present in an amount sufficient to impart acid-coagulable properties to the entire mass and coagulation of the emulsion occurs in the presence of low-molecular weight polystyrene sulfonic acid. Favourable sensitometric properties are obtained with effective coagulation washing.

8 Claims, No Drawings

METHOD OF PREPARING SILVER HALIDE EMULSIONS

The present invention relates to the preparation of washed photographic gelatino silver halide emulsions.

The preparation of a silver halide emulsion basically consists of a number of stages which are as follows:

1. the precipitation of very small silver halide grains, called emulsification by mixing an aqueous solution of a water-soluble silver salt commonly silver nitrate with an aqueous solution of a water-soluble halide commonly an ammonium halide or alkali metal halide in the presence of a hydrophilic colloid, in particular gelatin, which may be dissolved in either or both of the above solutions or in a separate aqueous solution;
2. the growth of the grains to the appropriate size, called physical ripening,
3. the removal of the by-products from the grain formation and growth stage, called washing,
4. the sensitization of the silver halide grains to obtain the desired speed, called digestion or chemical ripening or chemical sensitization,
5. the final preparation including the addition of spectral sensitizers (if desired), and the addition of other conventional emulsion ingredients before coating.

At the conclusion of the physical ripening stage the photographic emulsion comprises by-products of the grain formation and growth stage, excess halide, ammonia or acid, etc. which should be removed by washing.

The most conventional method of washing consists in cooling the emulsion so that it sets to a fairly soft jelly, comminuting it into small fragments, usually by shredding to produce noodles, and washing the fragments by suspending them in water. The water has to be changed frequently or continuously until the emulsion fragments are sufficiently free from the undesirable products. This washing method is thus very time consuming and allows no opportunity for concentrating the emulsion as the emulsion fragments swell during washing and the viscosity drops.

Modern methods of emulsion washing are based on the principle of causing the gelatin to coagulate or flocculate so that it settles together with the silver halide and thus separates from the aqueous solution comprising the soluble by-products. The supernatant solution is decanted or removed by some other method and the settled gelatin-silver halide mixture is redispersed, after washing of the precipitate, in water or aqueous gelatin. The flocculation method offers a number of advantages; in particular, a very high percentage of the unwanted salts may be removed in one stage and concentrated silver halide emulsions can be prepared.

Various methods of coagulating or flocculating silver halide emulsions have been proposed. For example, the gelatin-silver halide mixture can be coagulated by addition of salts e.g. sodium and ammonium sulphate. However, a large amount of the salt is required to obtain complete flocculation and this salt should be removed by repeated washing. Moreover, in order to avoid swelling of the emulsion during washing, an additional amount of salt is added in order to harden the emulsion flocculate which may make it difficult to redisperse the coagulum.

Water-miscible organic solvents into which the gelatin is insoluble can also be used to bring about flocculation, but this method is expensive and the precipitate contains salts that are insoluble in the organic solvent used.

It has further been proposed to use as flocculating agents organic polymeric or non-polymeric sulphonic acids or sulphuric acids for example naphthalene disulphonic acids, polystyrene sulphonic acid and derivatives, long-chain alkyl sulphonic acids and sulphuric acids such as the well-known anionic wetting agents, etc. Disadvantages of this method are the fact that if relatively high concentrations are used they have an adverse effect on the coating properties of the emulsion whereas if the flocculating agents are used in low concentration, the coagulation times are rather long and there is a tendency for the coagulum to swell and to become redispersed when it is washed. The supernatant liquid remains turbid and considerable losses in silver halide may be encountered.

Very convenient coagulation or flocculation methods for removing undesirable reaction products, residual water-soluble salts and excess water are based on the use of acid-coagulable gelatin derivatives e.g. phthaloyl gelatin as hydrophilic colloid medium for the precipitation of the silver halide at the emulsification stage, see for example U.S. Pat. Nos. 2,614,928, 2,614,929 and 2,728,662.

To effect coagulation or flocculation, the dispersion comprising silver halide and gelatin derivative is acidified after any ripening operations which may be considered advisable, to a pH of approximately 4.5 or less, e.g. between about 3 and about 4.5. The coagulum formed is then separated from the supernatant liquid and washed.

Although the coagulation methods based on the use of gelatin derivatives e.g. phthaloyl gelatin are attractive on the grounds that complete coagulation and washing is easy to effect, that the number of washing operations can be reduced and that silver halide emulsions with high silver halide concentration can be prepared, the sensitometric properties of the silver halide emulsion e.g. fog and gradation, dot-sharpness and tendency to form peppers in the case of emulsions of the lith-type, etc., are very often disadvantageously affected as compared with emulsions wherein normal unmodified gelatin is used as the hydrophilic colloid at the emulsification stage.

Attempts to eliminate these disadvantageous effects by replacing part of the gelatin-derivative by normal gelatin were successful, however, at the cost of less effective washing in that sedimentation after washing of the coagulum takes more time and is incomplete so that the supernatant liquid remains turbid.

In accordance with the present invention it has been found possible to benefit from the advantages of coagulation washing based on the use of acid coagulable gelatin-derivatives without being faced with the above problems, by using at the emulsification or silver halide precipitating stage a mixture of normal gelatin and an acid-coagulable gelatin-derivative, the said derivative being present in sufficient proportion to impart acid-coagulable properties to the entire mass, and by effecting coagulation in the presence of a polystyrene sulfonic acid of low viscosity having a molecular weight of at most 30,000.

The present invention therefore provides a method of preparing a washed photographic silver halide emulsion in which an emulsion incorporating an acid-coagulable gelatin derivative is prepared and wherein the undesirable by-products of silver halide grain formation and physical ripening are removed by lowering the pH (e.g. to a value in the range from about 3 to about 4.5) to bring about coagulation and by washing the coagulum, the method being characterized in that said silver halide grain formation occurs in an aqueous solution of both gelatin and an acid-coagulable gelatin-derivative, the said derivative being present in a proportion sufficient to impart acid-coagulable properties to the entire mass, and in that the said coagulation is carried out in the presence of low-viscosity polystyrene sulfonic acid having a molecular weight of at most 30,000.

The polystyrene sulfonic acid may be added before physical ripening, e.g. at the conclusion of the emulsification or silver halide precipitating stage. However, it is preferred to add the polystyrene sulfonic acid after physical ripening e.g. immediately before acidification. It is preferably used in an amount of about 3% to about 20% by weight relative to the amount of normal unmodified gelatin used at the emulsification stage. The weight ratio of gelatin to gelatin-derivative is preferably comprised between about 1:10 and about 5:1, preferably between about 1:2 and about 3:1.

As is known the polystyrene sulfonic acids can be obtained by sulfonation of polystyrene. They comprise in general, calculated on 3 benzene nuclei from about 1 to about 3, preferably about 2 sulfo groups. They can be added from aqueous solution e.g. solutions comprising from about 5 to about 20 percent by weight of polystyrene sulfonic acid.

As is described in the United States patents referred to above the acid-coagulable gelatin derivatives are reaction products of gelatin with organic carboxylic or sulfonic acid chlorides, carboxylic acid anhydrides, aromatic isocyanates or 1:4-diketones. Gelatin derivatives obtained by reaction with acid chlorides or acid anhydrides especially phthaloyl gelatin, are preferably used. N-phenylcarbamoyl gelatin is also very suitable for use in accordance with the present invention.

Coagulation of the dispersion of silver halide in a mixture of gelatin and an acid-coagulable gelatin-derivative comprising polystyrene sulfonic acid in accordance with the present invention, occurs by acidifying (e.g. to a pH within the range of about 3 to about 4.5) e.g. by means of dilute sulfuric acid, citric acid, acetic acid, etc. The coagulum formed may then be removed from the liquid by any suitable means, for example the supernatant liquid is decanted or removed by means of a siphon, whereupon the coagulum is washed out once or several times.

Whereas in the preceding emulsification and physical ripening stages a temperature is used generally comprised between about 35°C and about 70°C, dependent on the desired grain-size and thus emulsion speed to be obtained, coagulation may occur at a temperature comprised between about 10°C and about 50°C. It is preferred but not absolutely necessary to lower the temperature to about 10°-30°C before coagulation and thus before adjusting the pH to the coagulation point, e.g. between about 3 and about 4.5.

Washing of the coagulum may occur by rinsing with repeated changes of mere cold water which may be demineralised or not. However, the first wash water is preferably acidifed to lower the pH of the water to the coagulation point. Another advantageous method is to add to the first wash water polystyrene sulfonic acid of the kind described above in an amount preferably comprised between about 1% and about 10% relative to the total amount of gelatin, present during emulsification and physical ripening. Alternatively washing may be effected by redispersing the coagulum in water at elevated temperature using a small amount of alkali e.g. sodium or ammonium hydroxide, recoagulating by addition of an acid to reduce the pH to the coagulation point and subsequently removing the supernatant liquid. This redispersion and recoagulation operation may be repeated as many times as is necessary.

After the washing operation, the coagulum is redispersed to form a photographic emulsion suitable for the subsequent finishing and coating operations by treating preferably at a temperature within the range of about 35° to about 60°C, with the required quantity of water, normal gelatin, and if necessary, alkali, for a time sufficient to effect a complete redispersal of the coagulum. Instead or in addition to normal gelatin, which is preferably used, other known photographic hydrophilic colloids can also be used for redispersion e.g. a gelatin derivative as referred to above, albumin, agar-agar, sodium alginate, hydrolysed cellulose esters, polyvinyl alcohol, hydrophilic polyvinyl copolymers, etc. In redispersing the coagulum it may be necessary to add alkali e.g. ammonium or sodium hydroxide to obtain a practically neutral (pH from about 6 to about 7) silver halide emulsion. As described in co-pending application Ser. No. 359,512 filed May 11, 1973 it may be advantageous, in the preparation of highly sensitive silver halide emulsions, to compensate the loss in photographic speed owing to the low pH at which coagulation occurs by raising the pH, before, during or preferably, after redispersion of the coagulum, to a value of 8 or higher. Though this may be effected by simply bringing to pH 8 or higher and then immediately neutralizing (pH from about 6 to about 7) by means of an appropriate acid e.g. citric acid, sulfuric acid, etc. the pH is preferably kept at the pH of 8 or higher for some minutes e.g. from about 5 to about 20 minutes before neutralization.

The coagulation washed and redispersed silver halide emulsion may then be digested to the optimum relation between fog and sensitivity in a known manner at a temperature generally comprised between about 35°C and 60°C.

Digestion or chemical sensitization of the silver halide emulsion may occur according to any of the accepted procedures e.g. as described on page 107 of the December 1971 issue of Product Licensing Index published by Industrial Opportunities Limited, Havant, England — and in the patent literature referred to therein. It may be digested in the presence of small amounts of sulfur-containing compounds such as allyl thiocyanate, allyl thiourea, sodium thiosulfate, etc. The emulsion may also be sensitized by means of reductors for instance tin compounds as described in United Kingdom Patent Specification No. 789,823 polyamines e.g. diethyltriamine, and small amounts of noble metal compounds such as gold, platinum, palladium, iridium, ruthenium and rhodium as described by R. Koslowsky, Z. Wiss. Phot. 46, 67–72 (1951). Of course the emulsions may also be chemically sensitized by the combined use of these chemical sensitizers.

Photographic silver halide emulsions of all kinds may be prepared by the process of the invention, which include negative as well as direct-positive silver halide emulsions, coarse-grain as well as fine-grain silver halide emulsions. The silver halides may be silver bromide, silver chloride or silver chlorobromide and may comprise a small amount up to 10 mole % of silver iodide.

Before coating on a support, any one or more of the common so-called finals may be added to the photographic silver halide emulsions prepared in accordance with the present invention. These coating finals include spectral sensitizers, colour couplers, antifoggants and emulsion stabilizers, coating aids, plasticizers, light-absorbing dyes, hardeners, development modifiers, etc. a survey of which can be found on pages 107–109 of the December 1971 issue of Product Licensing Index, published by Industrial Opportunities Limited Havant, England.

The silver halide emulsions prepared in accordance with the present invention may be coated on the wide variety of supports known for use in photographic silver halide elements which include cellulose nitrate film, cellulose acetate film, poly(vinyl acetal) film, polystyrene film, poly(ethylene terephthalate) film, polycarbonate film and related films or resinous materials, as well as glass, paper, metal and the like. Paper supports may be used which are partially acylated or coated with baryta and/or an $\alpha$-olefin polymer, particularly a polymer of an $\alpha$-olefin containing from 2 to 10 C-atoms such as polyethylene, polypropylene, ethylenebutylene copolymers and the like.

The following examples illustrate the present invention.

EXAMPLE 1

Emulsion A

The silver halide was precipitated in a solution of 16 g normal gelatin and 16 g of phthaloyl gelatin (amino groups of gelatin acylated for about 90–100 percent) in 1000 ml of demineralized water by simultaneous addition at 55°C in 20 min. of the following solutions:

200 g of silver nitrate in 750 ml of distilled water,
24 g of ammonium bromide and 320 g of ammonium chloride in 650 ml of distilled water.

The silver halide grains were physically ripened for 40 min. whereupon 10 ml of a 15% aqueous solution of low-viscosity polystyrene sulfonic acid (prepared by sulphonation of polystyrene having an average molecular weight of 10,000, and having per three benzene nuclei somewhat more than 2 sulfo groups) were added and the pH was lowered to 3.5 by means of sulfuric acid. The emulsion coagulated and after settling, the supernatant liquid was decanted. The coagulum was washed three times with 2 litres of demineralized water. To the first two litres, 2 ml of a 15% aqueous solution of the above polystyrene sulfonic acid were added.

When the last wash-water was removed by means of a siphon the silver halide emulsion was redispersed in 500 ml of demineralized water and 78 g of normal gelatin were added.

The temperature was raised to 40°C and the pH was adjusted to 6, whereupon demineralized water was added to make 1000 g.

The emulsion obtained was then chemically sensitized until the optimum sensitivity - fog relationship was reached.

Emulsion B

Emulsion B was prepared as described for emulsion A with the only differences:
a. that 32 g of the phthaloyl gelatin were used and no normal gelatin at the silver halide precipitation stage, and
b. that neither before coagulation nor at the washing stage low-viscosity polystyrene sulfonic acid was added.

Emulsion C

Emulsion C was prepared in the same way as emulsion B with the only difference that to the first 2 litres of wash-water 4 ml of the 15% aqueous solution of polystyrene sulfonic acid were added.

Results

1. On addition of the sulphuric acid at the coagulation stage, emulsion A settled rapidly and the supernatant liquid as well as the wash-waters remained clear. In the case of emulsion B the coagulum settled rapidly in the mother liquor but upon washing settling occurred slowly and the wash-waters remained turbid. For emulsion C settling in the mother liquid as well as in the wash-waters occurred rapidly and the wash-waters remained clear.

2. When taking samples of emulsions A, B and C and coating these emulsion samples under identical circumstances on a paper support it was found that the emulsions showed the following fog values (for the same emulsion speed):

emulsion A : 0.01
emulsion B : 0.04
emulsion C : 0.04 upon development for 5 min. at 20°C in the following composition:

| | | |
|---|---|---|
| water | 800 | ml |
| p-monomethylaminophenol sulfate | 1.5 | g |
| sodium sulphite | 50 | g |
| hydroquinone | 6 | g |
| anhydrous sodium carbonate | 32 | g |
| potassium bromide | 2 | g |
| water to make | 1000 | ml |

EXAMPLE 2

Emulsion A

To a solution of 90 g of potassium bromide and 5 g of potassium iodide in 1000 ml of demineralized water into which also 15 g of normal gelatin and 5 g of phthaloyl gelatin (amino groups of gelatin acylated for about 90–100 percent) were dissolved, a solution of 100 g of silver nitrate in 80 ml demineralized water and 80 ml of 25% ammonia were added with stirring at 48°C. After 5 min., a solution of 175 g of potassium bromide in 500 ml demineralized water was added whereupon a solution of 150 g of silver nitrate in 120 ml demineralized water and 120 ml 25% ammonia was added in 8 min.

The silver halide grains were physically ripened for 30 min. whereupon 6 ml of a 15% aqueous solution of low viscosity polystyrene sulfonic were added and the pH was lowered to 3-4 by means of suluric acid. The emulsion coagulated and the coagulum, after removal of the supernatant liquid was washed four times with 2 litres of demineralized water by stirring and repeated decantation of the supernatant liquid.

When the last wash-water was removed by means of a siphon, the silver halide emulsion was redispersed in 800 ml demineralized water at 42°C. 90 g of normal gelatin were added and the pH adjusted to 7.

The emulsion was chemically sensitized at 46°C.

Emulsion B

Emulsion B was prepared as described for emulsion A with the only differences:
a. that 20 g of the phthaloyl gelatin were used and no normal gelatin at the silver halide precipitation stage,
b. that no polystyrene sulfonic acid was added before coagulation, and
c. that 2.5 ml of the 15% aqueous solution of polystyrene sulfonic acid were added to the first wash-water.

Results

1. In both cases coagulation and settling of the coagulum occurred in satisfactory times. When for emulsion B, no polystyrene sulfonic acid was added to the first wash-water, settling became more and more slow for each washing and the wash-waters became turbid.

2. The fog values determined as described in example 1 showed that emulsion B had 2 times higher a fog value than emulsion A (same emulsion speed).

We claim:

1. In a method of preparing a washed photographic silver halide emulsion in which an emulsion incorporating an acid-coagulable gelatin derivative is prepared and wherein the undesirable by-products of silver halide grain-formation and physical ripening are removed by lowering the pH to bring about coagulation and by washing the coagulum, the improvement which comprises effecting silver halide grain formation in an aqueous solution of both gelatin and an acid-coagulable gelatin derivative, the said derivative being present in a proportion sufficient to impart acid-coagulable properties to the entire mass, and effecting coagulation in the presence of a polystyrene sulfonic acid having a molecular weight of at most 30,000.

2. Method according to claim 1, wherein the said gelatin derivative is phthaloyl gelatin.

3. Method according to claim 1, wherein the weight ratio of gelatin to gelatin derivative is comprised between about 1:10 and about 5:1.

4. Method according to claim 1, wherein the polystyrene sulfonic acid is used in an amount comprised between about 3% and about 20% percent by weight relative to the amount of normal unmodified gelatin.

5. Method according to claim 1, wherein the polystyrene sulfonic acid is added after physical ripening.

6. Method according to claim 1, wherein after coagulation the coagulum formed is separated from the supernatant liquid, washed and redispersed by addition of water and gelatin.

7. Method according to claim 6, wherein washing of the coagulum occurs by means of several changes of water the first of which is acidified to the pH-value of coagulation.

8. Method according to claim 6, wherein washing of the coagulum occurs by means of several changes of water the first of which comprises polystyrene sulfonic acid having a molecular weight of at most 30,000.

* * * * *